No. 879,239.　　　　　　　　　　　　　　PATENTED FEB. 18, 1908.
J. B. BELL.
LINOTYPE MACHINE.
APPLICATION FILED MAY 4, 1907.
4 SHEETS—SHEET 3.
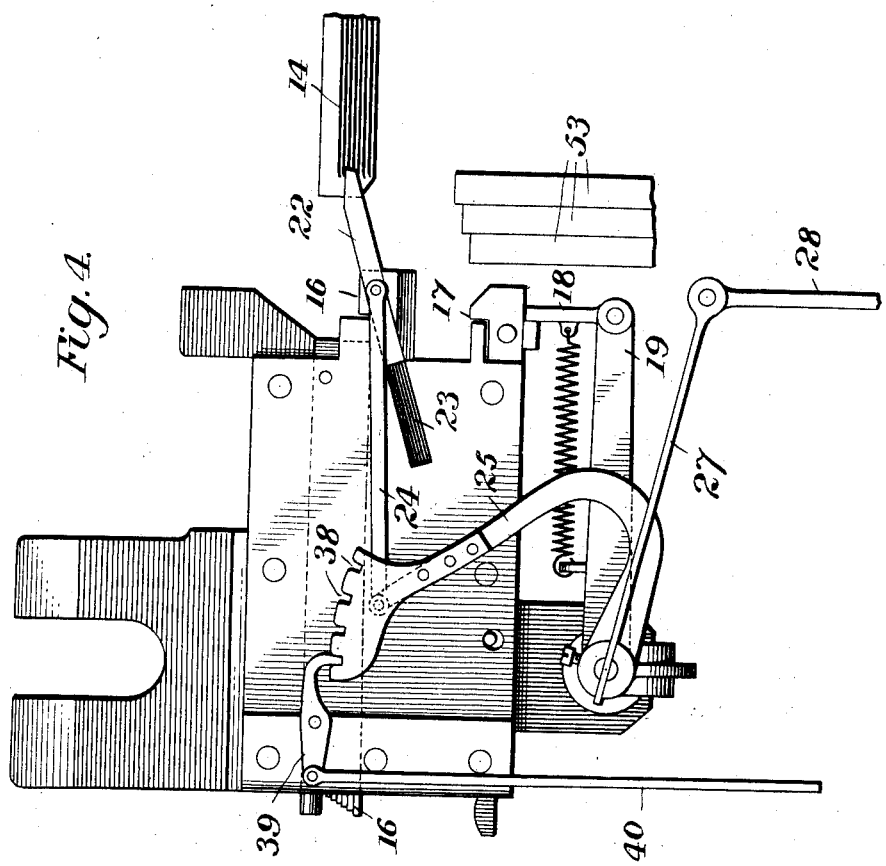
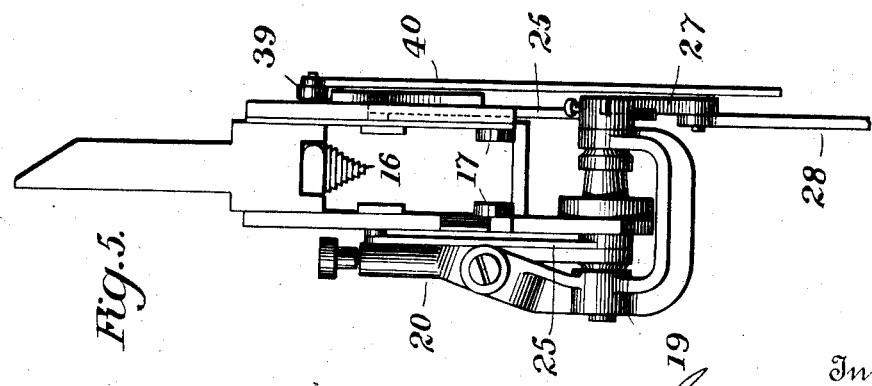
Witnesses　　　　　　　　　　　Inventor

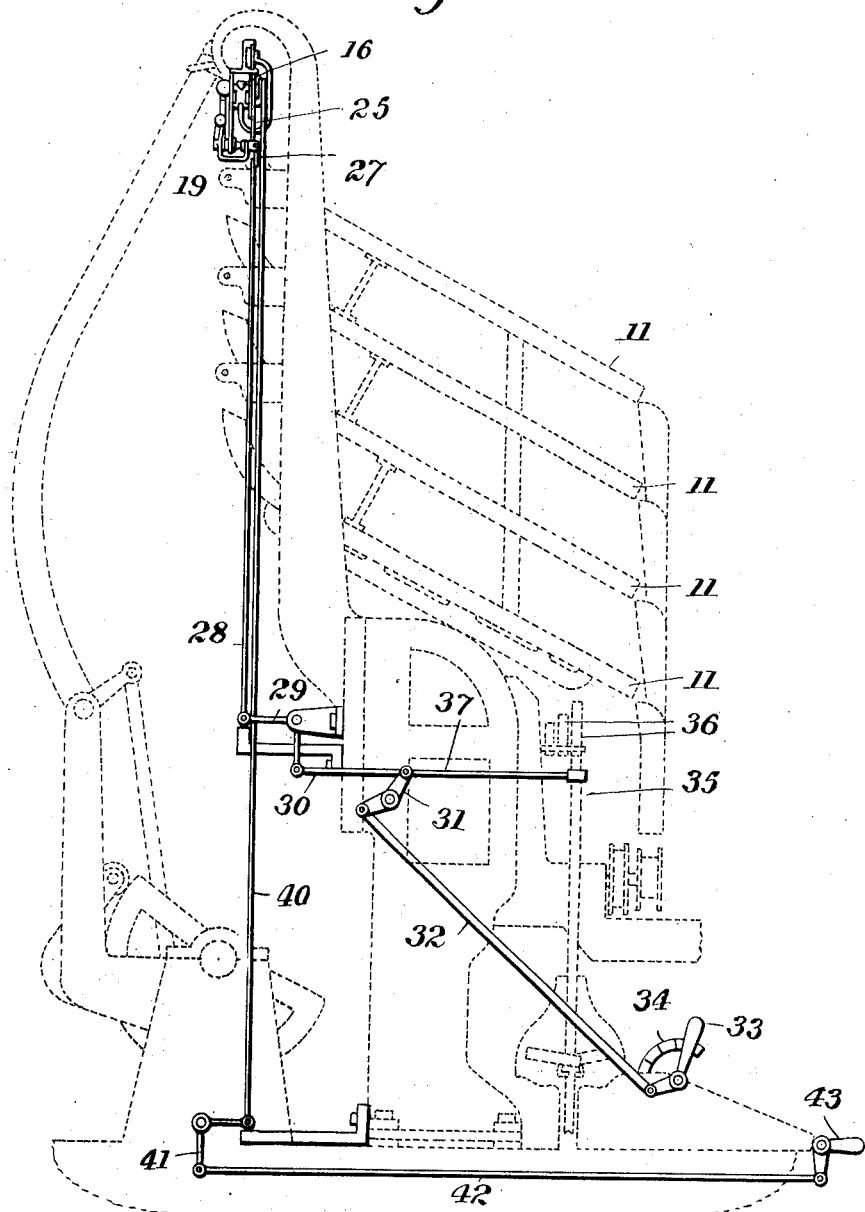

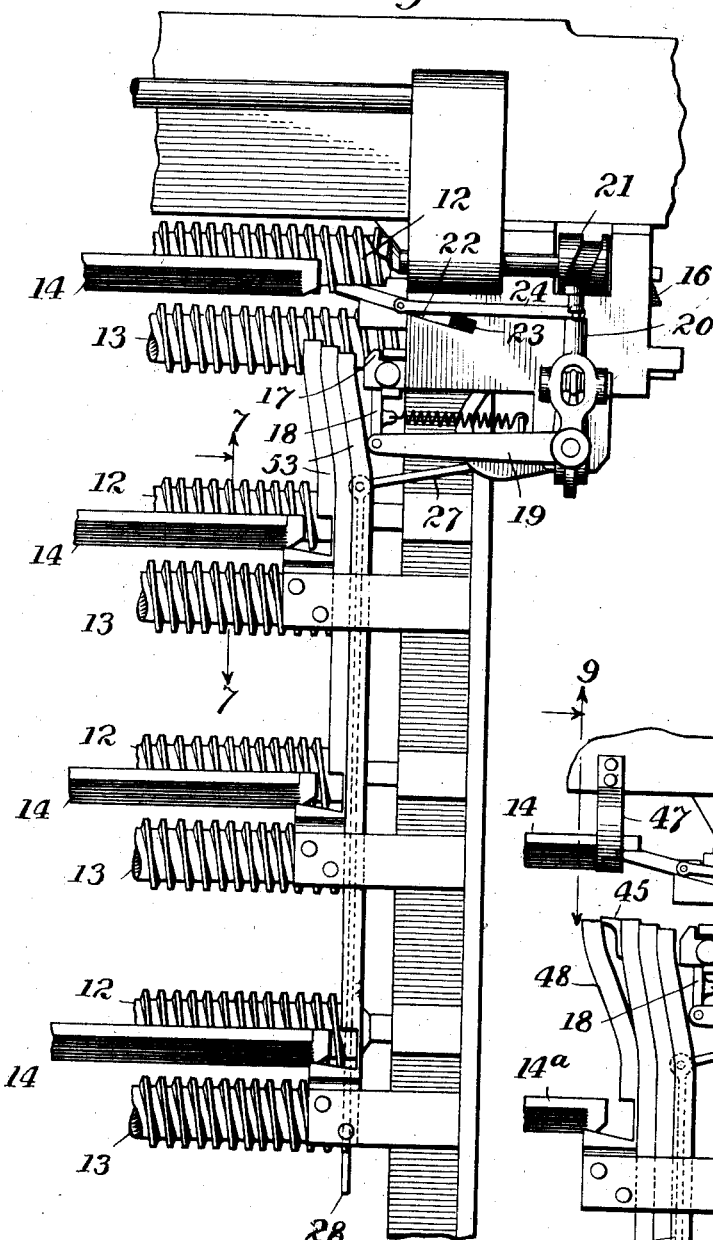
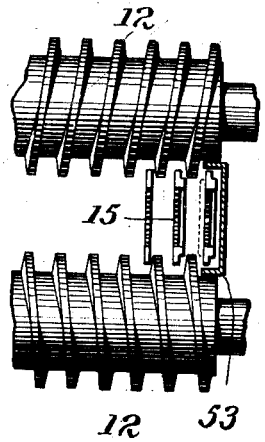
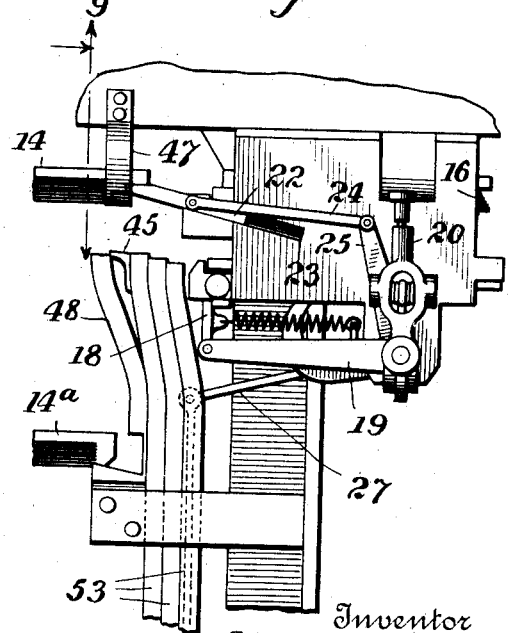

UNITED STATES PATENT OFFICE.

JEROME B. BELL, OF WILMINGTON, DELAWARE.

LINOTYPE-MACHINE.

No. 879,239.   Specification of Letters Patent.   Patented Feb. 18, 1908.

Application filed May 4, 1907. Serial No. 371,912.

*To all whom it may concern:*

Be it known that I, JEROME B. BELL, a citizen of the United States, and resident of Wilmington, Newcastle county, State of Delaware, have invented certain new and useful Improvements in Linotype-Machines, of which the following is a specification.

This invention relates particularly to the distributing mechanism of linotype machines and one object of the invention is to provide means for directing the matrices at will to any one of a series of distributing mechanisms, each of which mechanisms is adapted to distribute the matrices into the channels of a magazine.

Another object of the invention is to provide a plurality of fonts of matrices, the corresponding matrices of the several fonts having like distributing teeth or notches, in combination with a plurality of distributing mechanisms, and with means for directing the matrices to any one of said mechanisms. I am thus enabled to use a plurality of fonts of matrices interchangeably with a plurality of magazines, each font being adapted to the distributer of any one of the magazines, and I may replace the font in any magazine with any other font, if desired, without disturbing the magazines in the machine.

Figure 6:
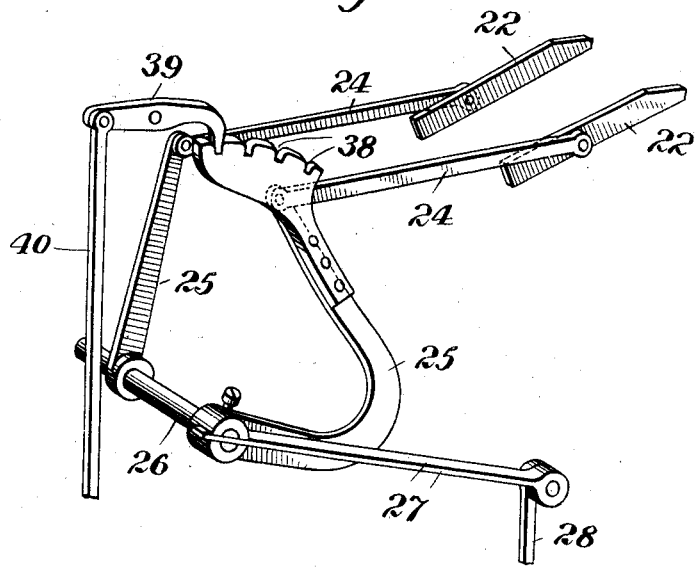
Figure 7:
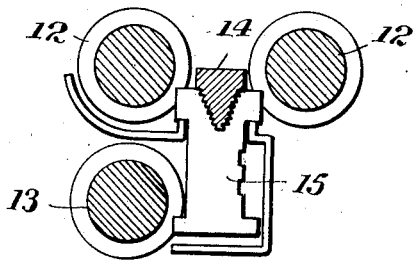
Figure 9:
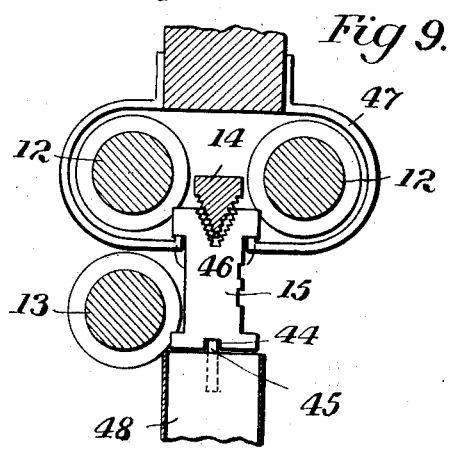

The invention will be described in detail in connection with the accompanying drawing, in which, Figure 1 is an end view of a portion of a linotype machine the parts which are old and well known being shown in dotted lines and the parts particularly pertinent to the present invention being shown in full lines; Fig. 2 is a rear view of a part of the distributing mechanism; Fig. 3 is a partial plan view of a pair of distributing screws for one of the lower magazines; Fig. 4 is a front view of the switching devices for directing the matrices to the different magazines; Fig. 5 is an end view of the same; Fig. 6 is a perspective view of the switching devices; Fig. 7 is a section on the line 7—7 of Fig. 2; Fig. 8 is a side view illustrating a modified form of the invention whereby different fonts may be used in the same line; Fig. 9 is a section on the line 9—9 of Fig. 8.

Referring to the drawings, 11 indicates the magazines, 12 the upper distributing screws of each magazine, 13 the lower distributing screw of each magazine and 14 the distributing bar of each magazine, all of which parts may be of any desired construction. The distributing bars are preferably provided with like arrangements of distributing notches which adapt them to distribute fonts of matrices 15 having like arrangements of distributing teeth. Means for assembling matrices into line and for casting the linotype slugs and the elevator for raising the matrices to the distributing mechanism may all be of any approved construction, such for instance, as are used in the well known Mergenthaler linotype machine.

In the Mergenthaler linotype machine the matrices are delivered by the elevator to a toothed bar in the distributing box and they are moved along this bar by a pusher until intercepted by stops and then lifted one by one over the stops and into engagement with the distributing screws and distributing bar. In the present invention the matrices are likewise delivered to the fixed toothed bar 16 in the distributing box and are moved by any suitable means into engagement with stops 17. By means of a lifter 18 the matrices are released successively from the stops 17 and moved up into engagement with the distributing screws 12, 13. The lifter 18 is operated by an arm 19 connected with a cam lever 20 having a roll engaging a cam 21 carried on the end of one of the screw shafts, all substantially as existing in the present commercial linotype machine.

A pair of rails 22 are arranged to slide longitudinally in inclined guides 23 in the distributer box. These rails when moved to their extreme forward position, as shown in Fig. 4, constitute a bridge which carries the matrices up and over to the distributing bar 14 of the upper magazine. The rails are so arranged that the upper lugs of the matrices engage and rest upon them after the latter are lifted over the stops 17. At the same time the matrices engage the screws and are carried up over the rails 22 and into engagement with the distributing bar by the usual operation of the screws.

When it is desired to deliver the matrices to one of the lower magazines, the rails 22 are drawn back until their forward ends stand above one of a series of tubes or chutes 53 which leads to the distributing bar of the selected magazine. Thus, as shown in Fig. 2, the rails are arranged to distribute matrices into the middle tube 53 which stands directly below the upper ends of the rails. I provide convenient means for adjusting the rails 22, one form of such means being illustrated in the drawings and constructed as follows:

Referring to Figs. 4 and 6, it will be seen that the rails 22 are connected by links 24 with arms 25 on a rock shaft 26, whereby when the shaft is rocked the rails move simultaneously. The shaft 26 also has a flexible arm 27 which is connected by a link 28, elbow lever 29, link 30, lever 31 and link 32 with a hand lever 33 which may be set in any desired position and retained therein by a notched sector 34. The hand lever 33 commonly called the magazine shift lever, is the usual lever for shifting the matrix releasing devices to select matrices from any desired magazine in a double-magazine machine. Thus, in Fig. 1, 35 indicates the usual series of lifter reeds for operating the escapements and 36 indicates the several series of escapement reeds which are more directly connected with the escapements. By means of the link 37 the lifter reeds 35 are also connected with the lever 31 and are shifted simultaneously with the operation of the hand lever 33.

On one of the arms 25 there are a series of notches 38 adapted to be engaged by a detent 39 to lock the arms 25 and the rails 22 in the several positions necessary to deliver matrices to the several magazines. The detent 39 is connected by means of link 40, lever 41, and link 42 with the "starting" or assembling elevator lever 43.

The operation of the mechanism thus far described is as follows: When the rails 22 are arranged as shown in Fig. 4, the matrices will be delivered to the distributer bar of the upper magazine. If it be desired to deliver matrices to the next lower magazine, the lever 33 is moved to the next notch on the segment 34, thereby placing the spring arm 27 under tension, the shaft 26 and arms 25 being held by the detent 39. The parts are left in this position until all matrices belonging to the upper magazine which are in circulation have been returned to the upper magazine. While these matrices are being returned, succeeding matrices are being assembled by the operator from the next lower or second magazine as the lifter reeds 35 have been shifted to operate the escapement reeds of said second magazine. In the ordinary operation of the machine the matrices belonging to the uppermost magazine which are in circulation when lever 33 is shifted will be returned to the uppermost magazine, or at least will have passed the rails 22 before the assembling elevator lever 43 is operated to start the machine for the purpose of casting from the first line assembled from a second magazine. The operation of the present invention may therefore be termed automatic inasmuch as it requires no thought or manipulation of the operator in addition to what is now required in operating machines having two magazines. Such machines now require a magazine shift lever or its equivalent for shifting the key board connections to operate the escapements of either one of the magazines and a starting lever or assembling elevator lever to start the machine after a line of matrices are assembled. I make use of these levers or their equivalents to adjust the assembling mechanism to coöperate with any one of a plurality of magazines and to adjust the distributing mechanism to direct the matrices back to respective magazines from which they are withdrawn. I therefore may be able to use three or more magazines with the same facility that two magazines have heretofore been used. It will be understood that when the assembling elevator lever 43 is operated the detent 39 is raised from engagement with one of the notches 38 and the spring arm 27 which has been placed under tension by the shift lever 33 will then immediately move the arms 25 and the rails 22 to the desired new position, in which position they will be locked by the detent 39 when arm 43 is released or shifted in the reverse direction. Thus in carrying out my invention by the means illustrated and described herein, I first adjust the magazine shift mechanism to release matrices from any given magazine and at the same time set or operate a device for subsequently determining the adjustment of the distributing mechanism to distribute matrices into the said given magazine and I arrange for this adjustment of the distributing mechanism to take place after an interval of time and when the starting or assembling elevator lever is operated for the first line of matrices selected from the given magazine. It will be evident that my invention might be carried out by other means, with which other features of the present linotype machine might be made to coöperate, but the mechanism shown and described herein will illustrate the invention in one practical form.

While my invention may be used in connection with a series of distributing mechanisms which differ from each other, and which are therefore not adapted to distribute a common font of matrices, I preferably make the distributing bars alike and provide the corresponding matrices of the different fonts with corresponding distributing teeth, whereby any font of matrices may be placed in any desired magazine. I may thus substitute a new magazine and font of matrices for any one in the machine, or I may discharge the matrices from any magazine and supply it with any new font of matrices desired. In other words, each of the magazines in my machine, together with its distributing mechanism, is adapted to receive any desired font of matrices and considerable time and labor heretofore required in making changes are saved, while the advantages of having all the matrices the same so far as their distributing features are concerned will be apparent both in the matter of their operation and manufacture.

In the form of the invention illustrated in Figs. 8 and 9, I provide means for delivering matrices into still another magazine. This is accomplished by providing the lower ends of the matrices designed for the extra magazine with notches 44 (Fig. 9) and providing a rail 45 which is adapted to enter the notches 44 and to sustain the matrices which are not provided with notches at a higher level. The matrices which are not provided with notches are carried forward at the higher level until they engage the distributing bar 14 of the uppermost magazine, while the matrices having notches 44 are permitted to drop until they are too low to engage the rail of the upper magazine. They are sustained in this position by the rail 45 and short rails 46, both of which terminate just above a tube 48 leading to the auxiliary distributing rail 14ᵃ. The rails 46 are carried by arms 47. It will thus be seen that my invention provides for distributing into any number of magazines which may be made to coöperate with the different positions of the rails 22 and into an additional magazine by means of the auxiliary rails 45 and 46, the purpose of the said additional magazine and related mechanism being to provide for the distribution of a line of matrices composed of different fonts taken from different magazines.

Having described my invention what I claim and desire to secure by Letters-Patent is, 1. In a linotype machine, the combination with a plurality of distributing mechanisms, of a plurality of fonts of matrices, and means for directing at will any font of matrices to any one of said distributing mechanisms, the portions of the matrices coöperating with said directing means being alike in the several fonts.

2. In a linotype machine, the combination with a plurality of distributing mechanisms, of a plurality of fonts of matrices, and means for directing at will any font of matrices to any one of said distributing mechanisms, said directing means comprising an adjustable device adapted to carry the matrices different distances and means for adjusting said device.

3. In a linotype machine, the combination with a plurality of distributing mechanisms, of a plurality of fonts of matrices, and means for directing at will any font of matrices to any one of said distributing mechanisms, said directing means comprising an adjustable bridge, means for moving the matrices over said device, and conduits adapted to receive the matrices from the device and direct them to the several distributing mechanisms.

4. In a linotype machine, the combination with a plurality of distributing mechanisms, of a plurality of fonts of matrices, means for directing at will any font of matrices to any one of said distributing mechanisms, said directing means comprising a pair of rails adapted to hold matrices in suspension, means for adjusting said rails, and conduits leading from beneath the rails to the several distributing mechanisms.

5. In a linotype machine, the combination with a plurality of distributing mechanisms, of rails movably mounted and coöperating with the distributing box, a series of conduits leading to several distributing mechanisms, and means for adjusting said rails to deliver matrices directly to the upper distributing mechanism or into any one of said conduits, as desired.

6. In a linotype machine, the combination with a plurality of distributing mechanisms, of a plurality of fonts of matrices, means for directing at will any font of matrices to any one of said distributing mechanisms, said directing means comprising a movable part, devices for locking said part in any desired position, and devices for placing said parts under tension to move when unlocked.

7. In a linotype machine having a plurality of magazines and a plurality of distributing mechanisms therefor, means for directing matrices at will to any one of said distributing mechanisms comprising a movable part, a device for moving said part, and a spring connection between said part and said device.

8. In a linotype machine having a plurality of magazines and a plurality of distributing mechanisms therefor, means for directing matrices at will to any one of said distributing mechanisms comprising a movable part, an operating device for moving said part, a spring connection between said part and said device, a locking device for said movable part, and means for releasing said device after said spring is placed under tension to move said part.

9. In a typographic machine, the combination with a plurality of magazines and a plurality of distributing mechanisms therefor, of means comprising a movable part adapted to deliver type or matrices to any one of said distributing mechanisms, means for indicating a desired movement of said part and means for thereafter automatically moving said part as desired.

10. In a typographic machine, the combination with a plurality of magazines and a plurality of distributing mechanisms therefor, of means comprising a movable part adapted to deliver type or matrices to any one of said distributing mechanisms, means for indicating the desired movement of said part, devices for locking said part against such movement temporarily, and means for moving said part when released from its locking devices.

11. In a linotype machine, the combination with a plurality of magazines and distributing bars therefor, of a distributing box, movable rails adapted when in one position to carry matrices from said box to one of said distributing bars and when in other positions to carry said matrices to points between said last mentioned bar and the distributing box, and means for conducting matrices from said intermediate points to the other distributing bars.

12. In a typographic machine, the combination with a plurality of magazines and a plurality of distributing mechanisms therefor, of means connected with the magazine shift mechanism for indicating a desired adjustment of the distributing mechanism to effect distribution into a selected magazine, and means connected with the assembling elevator lever for effecting such desired movement.

13. In a typographic machine, the combination with a plurality of magazines and a plurality of distributing mechanisms therefor, of a magazine shift mechanism for connecting the assembling mechanism with any desired magazine, means connected with said magazine shift lever for indicating an adjustment of the distributing mechanism necessary to coöperate with the selected magazine, and a start or assembling elevator lever and means controlled thereby for effecting the desired adjustment of the distributing mechanism subsequent to the operation of the magazine shift lever.

In testimony whereof I affix my signature in presence of two witnesses.

JEROME B. BELL.

Witnesses:
   JOSEPH H. MARTIN,
   ANNA B. WORTHINGTON.